INVENTOR.
HENRY N. WEISS
BY Peter Xrarhos
AGENT.

Aug. 11, 1970 H. N. WEISS 3,524,163

PARITY-CHECKING APPARATUS FOR CODED-VEHICLE IDENTIFICATION SYSTEMS

Filed Dec. 4, 1967 4 Sheets-Sheet 2

INVENTOR.
HENRY N. WEISS

BY Peter Xiarhos

AGENT.

INVENTOR.
HENRY N. WEISS

BY Peter Xiarhos

AGENT.

Aug. 11, 1970 H. N. WEISS 3,524,163

PARITY-CHECKING APPARATUS FOR CODED-VEHICLE IDENTIFICATION SYSTEMS

Filed Dec. 4, 1967 4 Sheets-Sheet 4

INVENTOR.
HENRY N. WEISS

BY Peter Xiarhos

AGENT.

3,524,163

PARITY-CHECKING APPARATUS FOR CODED-VEHICLE IDENTIFICATION SYSTEMS

Henry N. Weiss, Waltham, Mass., assignor to Sylvania Electric Products, Inc., a corporation of Delaware Filed Dec. 4, 1967, Ser. No. 687,774
Int. Cl. G06f *11/10*; G06k *5/00*
U.S. Cl. 340—146.1 15 Claims

ABSTRACT OF THE DISCLOSURE

Parity-checking apparatus for use in coded-vehicle identification systems. A retroreflective label, coded to represent a plurality of digits $a_0 \ldots a_n$ and a parity check integer $R_C$, is affixed to a vehicle. As the vehicle passes a scanning station, the coded label is scanned and signals are produced representative of the label information. The parity of the signals representative of the digits $a_0 \ldots a_n$ is calculated by a parity calculator included in the parity-checking apparatus in accordance with a powers-of-two modulo-eleven system of parity by solving for R in $$\frac{a_0 2^0 + a_1 2^1 + \ldots a_n 2^n}{11} = I + \frac{R}{11}$$

for the particular values of $a_0 \ldots a_n$. To determine the correctness of the code information derived from the label, the value of the calculated parity is checked in the parity-checking apparatus against the value of the parity check integer $R_C$ of the label.

BACKGROUND OF THE INVENTION

The present invention relates to parity-checking apparatus and, more particularly, to parity-checking apparatus including parity-calculating apparatus for use in coded-vehicle identification systems.

In existing coded-vehicle identification systems it is often necessary or desirable to provide some means for verifying whether coded information has been correctly sensed from or transmitted by a vehicle, the identity of which is to be ascertained at a particular location. A wide variety of code-verification apparatus is presently available for determining the correctness of coded information received from a vehicle including parity-checking apparatus, pulse and binary digit counting apparatus, redundancy polling apparatus, and monitoring apparatus for recognizing codes of a predetermined format, for example, *m*-out-of-*n* codes.

The present invention is primarily concerned with code-verification apparatus of the parity-checking type and, more particularly, with parity calculating apparatus which calculates the parity of multi-digit binary-coded signals in accordance with a parity system commonly known as the "powers-of-two modulo-eleven" system. Unlike the more conventional odd-parity and even-parity systems wherein the parity of a multi-digit binary-coded message is determined from the number of binary "ones" or binary "zeros" in each coded digit, and unlike conventional Hamming code parity systems wherein parity is determined from an arrangement of several parity bits, the parity of a multi-digit binary-coded message is determined in accordance with the powers-of-two modulo-eleven system by multiplying the values of the binary-coded digits of the coded message by progressively increasing powers of two, summing the individual products, and dividing the sum by 11. The remainder resulting from division of the summed products by 11 represents the parity of the coded message. Mathematically, the powers-of-two modulo-eleven parity system may be expressed by the equation $$\frac{a_0 2^0 + a_1 2^1 + \ldots + a_n 2^n}{11} = I + \frac{R}{11} \quad (1)$$

where $a_0 \ldots a_n$ represent the individual digits of the coded message, I is an integer representing the maximum number of times that the numerator $a_0 2^0 + \ldots + a_n 2^n$ is divisible by the denominator 11, and R is the remainder which represents the parity of the coded message.

The particular features of the powers-of-two modulo-eleven system that make such a system attractive in a coded-vehicle identification system are that compensating errors or transpositional errors in a received coded message, comprising a plurality of digits, are readily detected. Consequently, more effective code verification may be achieved.

SUMMARY OF THE INVENTION

In accordance with the present invention, a coded-vehicle identification system is provided including a vehicle on which a coded label is disposed. The label is coded to represent a plurality of integers $a_0 \ldots a_n$, each of the integers $a_0 \ldots a_n$ having a given number assigned thereto, the number including 0, and a given value. Typically, the number assigned to an integer corresponds to the position of the integer in the sequence in which the integers are coded on the label. The label is also coded to represent a parity check integer having a value related to the values of the plurality of integers $a_0 \ldots a_n$ represented by the label.

In the operation of the invention, a plurality of signals representative of the plurality of integers $a_0 \ldots a_n$ and the parity check integer are acquired from the coded label by a suitable means and the plurality of signals representative of the plurality of integers $a_0 \ldots a_n$ are applied to a plurality of data storage means and retained therein. Each of the plurality of signals representative of the integers $a_0 \ldots a_n$ also has an assigned number and a value corresponding to the assigned number and value of the associated integer. The parity signal has a value corresponding to the value of the parity check integer. The signals representative of the plurality of integers $a_0 \ldots a_n$ are also applied in succession to a calculator apparatus in accordance with the invention, which calculator apparatus calculates a value for the remainder R in $$\frac{a_0 x^0 + a_1 x^1 + \ldots + a_n x^n}{K} = I + \frac{R}{K}$$

where $x$ and K are integers and I is an integer representing the maximum number of times that the numerator $a_0 x^0 + a_1 x^1 + \ldots + a_n x^n$ is divisible by K, and further produces an output signal having a value equal to the value of R. For the powers-of-two modulo-eleven parity system discussed hereinabove, $x$ has a value of 2 and K has a value of 11.

The calculator apparatus of the invention comprises a first storage means adapted to receive and to store in succession the plurality of signals representative of the integers $a_0 \ldots a_n$, a second storage means adapted to store signals, a multiplying means operable to perform multiplication operations on the signals received in the first storage means and to produce product signals therefrom, an adder means operable to receive product signals from the multiplying means and to produce output signals at an output thereof, and a transfer means coupled between the output of the added means and the first storage means.

In the operation of the calculator apparatus, the multiplying means and adder means jointly cooperate to produce at the output of the adder means a series of derivative signals from each of the plurality of signals representative of the integers $a_0 \ldots a_n$ and stored in the first storage means. The number of derivative signals in a series produced at the output of the adder means is equal to the particular number assigned to the signal representative of the integer from which the series of derivative signals is produced. The transfer means operates to transfer each of the derivative signals in each series in succession from the output of the adder means to the first storage means to be received and stored therein, each derivative signal of a series being stored in the first storage means subsequent to the storage of the signal representative of the integer from which signal the series is derived.

In cooperating with the adder means to produce the series of derivative signals from the plurality of signals representative of the integers $a_0 \ldots a_n$, the multiplying means operates to multiply the value of each of the plurality of signals representative of the integers $a_0 \ldots a_n$ and each derivative signal produced therefrom by a first predetermined quantity ("$x$" in the above equation). The total number of multiplying operations associated with each of the plurality of signals representative of the integers $a_0 \ldots a_n$ is equal to the particular number assigned to the signal. As a result of each multiplying operation, a product signal is produced by the multiplying means and applied to the adder means.

In response to receiving each product signal from the mutilplying means, the adder means operates to substract from the value thereof an amount equal to a second predetermined quantity ("K" in the above equation) if the value of the product signal is equal to or greater than the second predetermined quantity and to produce a derivative signal having a value equal to the difference, or to produce a derivative signal having a value equal to the value of the product signal if the product signal has a value less than the second predetermined quantity.

The adder means further operates, after the last derivative signal in each series is produced from a signal representative of one of the integers $a_0 \ldots a_n$ and transferred to and stored in the first storage means, to add the value of the signal present in the first storage means to the value of the signal then present in the second storage means and, if the value of the sum is equal to or greater than the second predetermined quantity, to substract an amount therefrom equal to the second predetermined quantity and to produce to the second storage means a signal having a value equal to the difference, or, if the value of the sum is less than the second predetermined quantity, to produce to the second storage means a signal having a value equal to the sum.

To determine whether the plurality of signals representative of the integers $a_0 \ldots a_n$ and the parity signal representative of the parity check integer have been correctly acquired from the coded label, the value of the last signal stored in the second storage means, representing the calculated parity, is checked against the value of the parity signal representative of the parity check integer. In accordance with parity-checking apparatus of a first embodiment of the invention, the last signal stored in the second storage means is complemented by an inverter means and the parity signal acquired from the coded label is applied, without a change in the value thereof, to the adder means. The adder means operates to add the complemented signal and the parity signal and produces a first signal condition to the plurality of data storage means if the sum of the values of the complemented and parity signals is equal to a predetermined value, or produces a second signal condition to the plurality of data storage means if the sum of the values of the complemented and parity signals is other than the predetermined value. In response to receiving the first signal condition, the plurality of data storage means are rendered operative to transfer therefrom for subsequent processing the plurality of signals representative of the integers $a_0 \ldots a_n$.

In accordance with a parity-checking apparatus of an alternative embodiment of the invention, the parity signal acquired from the coded label and the last signal stored in the second storage means of the calculator apparatus (representative of the calculated parity) are applied to a comparator means and compared therein. If the signals bear a predetermined relationship to each other, a first output signal is produced by the comparator means and applied to the plurality of data storage means. If the signals do not bear the predetermined relationship to each other, a second output signal is produced by the comparator means and applied to the plurality of data storage means. In response to receiving the first output signal, the plurality of data storage means are rendered operative to transfer therefrom the plurality of signals representative of the integers $a_0 \ldots a_n$.

CODED-VEHICLE IDENTIFICATION SYSTEM—FIG. 1

Figure 1:
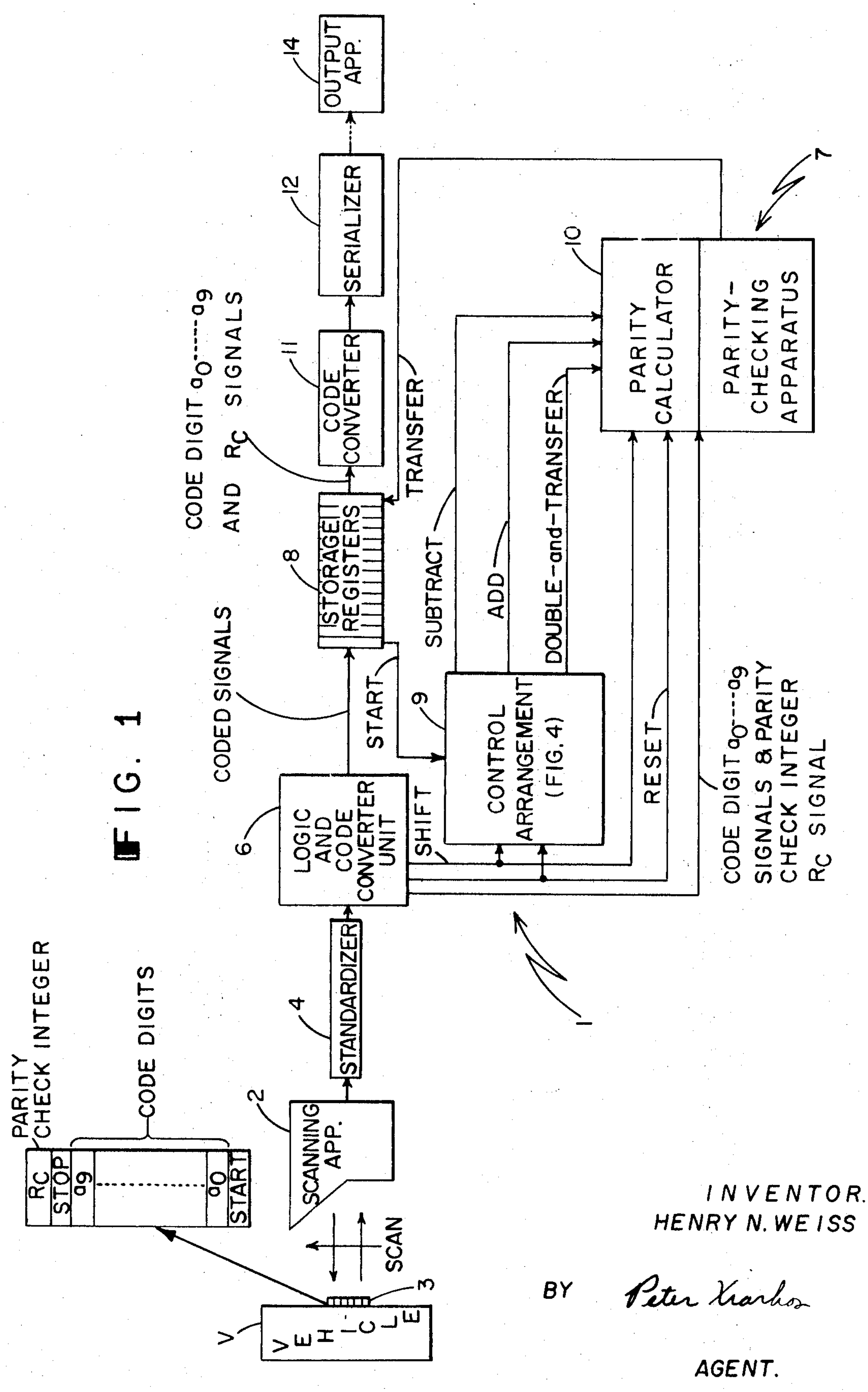
FIG. 1 is a schematic block diagram representative of a coded-vehicle identification system employing parity-checking apparatus including a parity calculator in accordance with a first embodiment of the invention.

Referring to FIG. 1, there is shown in a schematic block diagram form a coded-vehicle identification system 1 employing a parity-checking apparatus 7 in accordance with a first embodiment of the invention. As shown in FIG. 1, the coded-vehicle identification system 1 includes a scanning apparatus 2 adapted to scan a coded label 3 affixed to a vehicle V and to produce signals representative of the code information on the label 3. A standardizer 4 connected to the scanning apparatus 2 operates to convert each of the signals from the scanning apparatus 2 into a signal having a standardized amplitude.

A logic and code converter unit 6 connected to the standardizer 4 operates to convert the standardized signals from the standardizer 4 into binary-coded signals, which binary-coded signals are then successively applied to and stored in a plurality of storage or data registers 8. Various ones of the binary-coded signals produced by the logic and code converter unit 6 are also applied in succession to a parity calculator 10 included in the parity-checking apparatus 7 by means of SHIFT signals generated by the logic and code converter unit 6 and applied to the parity calculator 10. Additionally, appropriate RESET signals generated by the logic and code converter unit 6 are applied to a control arrangement 9 and to the parity calculator 10.

The parity-checking apparatus 7, under control of signals from the control arrangement 9 and from the logic and code converter unit 6, operates to verify the correctness of the coded information derived from the label 3 by the scanning apparatus 2. More particularly, if the information derived from the coded label 3 is determined to be correct by the parity-checking apparatus 7, a TRANSFER signal is produced thereby and applied to the plurality of storage or data registers 8 to allow binary-coded signals stored in selected ones of the plurality of registers 8 to be transferred to a code converter 11. Otherwise, such transfer of the coded signals is prevented by the parity-checking apparatus 7. The code converter 11 serves to convert the binary-coded signals from the plurality of storage registers 8 into signals suitable for further processing. A serializer 12 connected to the code converter 11 translates the signals from the code converter 11 into a serial form, which signals in serial form are then applied to a suitable output apparatus 14.

The coded label 3 of FIG. 1 is preferably of a retro-reflective type such as described in detail in U.S. Pat.

No. 3,225,177 to Stites et al., assigned to the assignee of the present application. Briefly, the coded label 3 is fabricated from rectangular orange, blue, and white retroreflective stripes, and non-retroreflective black stripes. The orange, blue, and white retroreflective stripes have the capability of reflecting substantially all of an incident light beam back along the path of incidence. The black stripes effectively lack such a capability of retroreflection. The label 3 is suitably coded, for example, in a two-position base-four code, by various two-stripe combinations of the retroreflective orange, blue, and white stripes and the non-retroreflective black stripes, to represent in a sequential format blocks of information including a START control word, a plurality of digits $a_0 \ldots a_9$, each having a decimal value of $0 \ldots 9$, a STOP control word, and a parity check integer $R_C$. The above-described format of the coded label information is shown in a blown-up pictorial form in FIG. 1. The rectangular label stripes are mounted in a vertical succession, each stripe having a horizontal orientation, on the side of the vehicle V. The decimal value of the parity check integer $R_C$ forming part of the label code information is determined from Equation 1 by substituting the particular decimal value $0 \ldots 9$ selected for each of the digits $a_0 \ldots a_9$ in Equation 1, and by performing the required arithmetic operations indicated in Equation 1 to solve for R.

The detailed manner of operation of the coded-vehicle identification system 1 of FIG. 1 is as follows: When the vehicle V bearing the coded retroreflective label 3 passes the scanning apparatus 2, the scanning apparatus 2 scans the multiple stripes of the label 3 and produces a plurality of pulse signals representative of the coded label information, that is, the START control word, the digits $a_0 \ldots a_9$ information, the STOP control word, and the parity check integer $R_C$ information. Although not shown in FIG. 1, the scanning apparatus 2 typically includes a source of light and a rotating drum having a plurality of mirrors mounted on its periphery. As the drum rotates, the mirrors cause a beam of light to vertically scan the coded label 3 from bottom to top, the light reflected from the retroreflective stripes of the coded label 3 being divided by a dichroic optical system (not shown) into orange and blue "channels" for application to respective sensors, the output pulse signals from which are applied to the standardizer 4. For additional or more specific details regarding the scanning apparatus 2, reference may be made to the above-cited patent to Stites et al.

The standardizer 4 may be of a type described in detail in U.S. Pat No. 3,299,271 to Stites, also assigned to the assignee of the present application. The standardizer 4 operates to measure the widths at the half-amplitude points of the individual pulse signals received in succession from the scanning apparatus 2 as the retroreflective stripes of the coded label 3 are successively scanned, and to convert the pulse signals measured at the half-amplitude points into signals each having a uniform, standardized amplitude.

The signals processed by the standardizer 4, representing the START control word, the digit $a_0 \ldots a_9$ information, the STOP control word, and the parity check integer $R_C$ information, are applied to the logic and code converter unit 6 wherein each block of information (in a two-position base four code) is converted to a binary-coded signal comprising four bits. The binary-coded signals from the code converted 6 are successively applied to and stored in the plurality of storage registers 8, individual registers being used to store the four-bit coded signals representing the START control word, the digit $a_0 \ldots a_9$, the STOP control word, and the parity check integer $R_C$. Additionally, certain ones of the coded signals, namely, the coded signals representative of the digits $a_0 \ldots a_9$ and the parity check integer $R_C$, are also applied in succession to the parity calculator 10 by means of SHIFT signals from the logic and code converter unit 6.

To determine the validity of the information derived from the coded label 3, that is, whether the information derived from the coded label 3 by the scanning apparatus 2 is correct, the coded signals representative of the digits $a_0 \ldots a_9$ are individually and successively shifted into the parity calculator 10 by means of the SHIFT signals from the logic and code converter unit 6. The control arrangement 9, in response to receiving a signal representative of the START control word from one of the plurality of storage registers 8 and appropriately-timed SHIFT and RESET signals from the logic and code converter unit 6, produces a plurality of appropriately-timed output control signals, designated in FIG. 1 as DOUBLE-and-TRANSFER, ADD, and SUBTRACT, to cause the parity calculator 10 to solve for R in Equation 1 and to produce a coded signal representative of the calculated parity, designated hereinafter as $R_C'$. The RESET signals are applied by the logic and code converter unit 6 to the parity calculator 10 and to the control arrangement 9 to reset elements included therein after each of the signals representative of the digits $a_0 \ldots a_9$ has been operated on by the parity calculator 10.

Once the value of the calculated parity $R_C'$ is derived by the parity calculator 10, the coded signal representative of the parity check integer $R_C$ is applied by the logic and code converter unit 6 to the parity calculator 10 and its value is checked against the value of $R_C'$ as derived by the parity calculator 10. If the values of $R_C$ and $R_C'$ are the same, thereby indicating that the information derived from the coded label 3 was correctly acquired, an output TRANSFER signal is produced by the parity-checking apparatus 7 and applied to the plurality of storage registers 8 to transfer the coded four-bit signals representative of the digits $a_0 \ldots a_9$ and the parity check integer $R_C$ stored therein into the code converter 11. If the value of $R_C$ is not the same as the value of $R_C'$ thereby indicating that the information derived from the coded label 3 was not correctly and properly received, an output signal is produced by the parity-checking apparatus 7 preventing the transfer of the coded signals from the plurality of storage registers 8 to the code converter 11. If desired, the output TRANSFER signal may be applied to the plurality of storage registers 8 such that only the coded signals representative of the digits $a_0 \ldots a_9$ are shifted out of the plurality of registers 8.

The code converter 11 converts the properly-received four-bit signals stored in the plurality of storage registers 8, as verified by the parity-checking apparatus 7, into any suitable code arrangement, for example, a five-level teletypewriter code. The serializer 12 converts the coded data processed by the code converter 11 into a serial train of pulses, which pulses are then applied via a direct communication line or other suitable communication link to an appropriate local or remote output apparatus 14, for example, a computer, or printout device.

PARITY-CHECKING APPARATUS 7—FIG. 2

Figure 2:
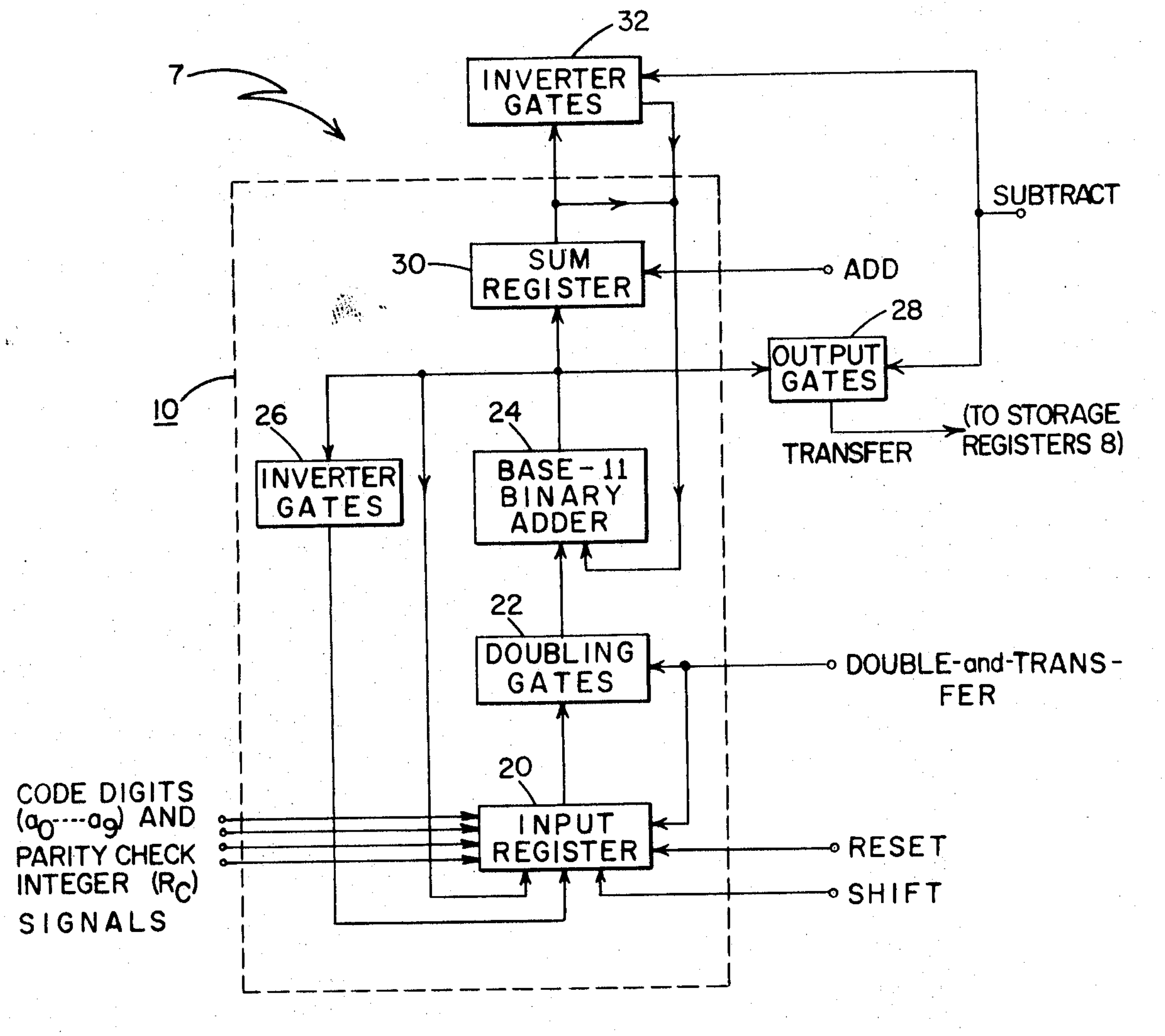
FIG. 2 is a more detailed showing of the parity-checking apparatus of FIG. 1.

The parity-checking apparatus 7 of FIG. 1 including the parity calculator 10 are shown in greater detail in FIG. 2. As shown therein, the parity-checking apparatus 7 comprises the parity calculator 10 and a plurality of converter gates 32 and output gates 28 coupled thereto. The parity calculator 10 further comprises: an input register 20 adapted to individually receive and to store in sequence coded signals representative of the digits $a_0 \ldots a_9$ and the parity check integer $R_C$; a plurality of doubling gates 22 coupled to the input register 20 and operable to multiply the value of coded signals stored in the input register 20; a sum register 30; a base-11 binary adder 24 connected between the plurality of doubling gates 22 and the sum register 30 and adapted to process individual coded signals from the doubling gates 22 and also to add the contents of both the input register 20 and the sum register 30; and a plurality of inverter gates 26 connected between the binary adder 24 and the input register 20 for complementing output signals of the binary adder 24.

Although the various elements constituting the parity-checking apparatus 7 of FIG. 2 are shown to be interconnected by single lines, such showing is for the sake of simplicity only, each of the interconnecting lines actually representing four parallel lines, one line for each of the four bits of a coded digit. The various timing and control signals for controlling the operation of the parity-checking apparatus 7 are designated in FIG. 2 as RESET, SHIFT, DOUBLE-and-TRANSFER, ADD, and SUBTRACT. The manner in which the parity-checking apparatus 7 and the parity calculator 10 operate will now be described. For the sake of completeness and clarity of understanding, the operation of the parity calculator 10 will be described in connection with Equation 1.

It will be recalled that in accordance with the "powers-of-two modulo-eleven" system of parity, parity is determined by solving for the remainder R in Equation 1

$$\frac{a_0 2^0 + a_1 2^1 \ldots + a_n 2^n}{11} = I + \frac{R}{11}$$

If a coded label including ten digits $a_0 \ldots a_9$ ($a_n = a_9$ in Equation 1) is employed as discussed hereinabove in connection with the coded-vehicle identification system 1 of FIG. 1, Equation 1 becomes $$\frac{a_0 2^0 + a_1 2^1 + a_2 2^2 + a_3 2^3 + a_4 2^4 + a_5 2^5 + a_6 2^6 + a_7 2^7 + a_8 2^8 + a_9 2^9}{11} = I + \frac{R}{11} \quad (2)$$

where $a_0 \ldots a_9$ represent the digits of the coded label 3, I is an integer representing the maximum number of times that the numerator $a_0 2^0 + \ldots + a_9 2^9$ is divisible by 11, and R is the remainder which represents the parity of the $a_0 \ldots a_9$ coded information. Equation 2 may be alternatively expressed by $$\frac{a_0 2^0}{11} + \frac{a_1 2^1}{11} + \frac{a_2 2^2}{11} + \frac{a_3 2^3}{11} + \frac{a_4 2^4}{11} + \frac{a_5 2^5}{11} + \frac{a_6 2^6}{11} + \frac{a_7 2^7}{11} + \frac{a_8 2^8}{11} + \frac{a_9 2^9}{11} = I + \frac{R}{11} \quad (3)$$

Further, each of the individual expressions of the left side of Equation 3 may be expressed by $$\frac{a_0 2^0}{11} = I_0 + \frac{R_0}{11} \quad (4)$$

$$\frac{a_1 2^1}{11} = I_1 + \frac{R_1}{11} \quad (5)$$

$$\frac{a_2 2^2}{11} = I_2 + \frac{R_2}{11} \quad (6)$$

$$\frac{a_3 2^3}{11} = I_3 + \frac{R_3}{11} \quad (7)$$

$$\frac{a_4 2^4}{11} = I_4 + \frac{R_4}{11} \quad (8)$$

$$\frac{a_5 2^5}{11} = I_5 + \frac{R_5}{11} \quad (9)$$

$$\frac{a_6 2^6}{11} = I_6 + \frac{R_6}{11} \quad (10)$$

$$\frac{a_7 2^7}{11} = I_7 + \frac{R_7}{11} \quad (11)$$

$$\frac{a_8 2^8}{11} = I_8 + \frac{R_8}{11} \quad (12)$$

$$\frac{a_9 2^9}{11} = I_9 + \frac{R_9}{11} \quad (13)$$

To determine the parity of the coded information comprising the digits $a_0 \ldots a_9$, the following set of equations, using the values of $R_0 \ldots R_9$ from Equations 4–13, are solved in succession. The calculated value of parity is indicated at $R_C'$ in Equation 22.

$$\frac{(R_0 + R_1)}{11} = I_a + \frac{R_a}{11} \quad (14)$$

$$\frac{(R_a + R_2)}{11} = I_b + \frac{R_b}{11} \quad (15)$$

$$\frac{(R_b + R_3)}{11} = I_c + \frac{R_c}{11} \quad (16)$$

$$\frac{(R_c + R_4)}{11} = I_d + \frac{R_d}{11} \quad (17)$$

$$\frac{(R_d + R_5)}{11} = I_e + \frac{R_e}{11} \quad (18)$$

$$\frac{(R_e + R_6)}{11} = I_f + \frac{R_f}{11} \quad (19)$$

$$\frac{(R_f + R_7)}{11} = I_g + \frac{R_g}{11} \quad (20)$$

$$\frac{(R_g + R_8)}{11} = I_h + \frac{R_h}{11} \quad (21)$$

$$\frac{(R_h + R_9)}{11} = I_i + \frac{R_C'}{11} \quad (22)$$

As will become more fully apparent hereinafter, the parity calculator 10 of FIG. 2 operates to provide a solution for $R_C'$ in Equation 22 by calculating the values of $R_0 \ldots R_9$ in Equations 4–13 and by calculating the values of $R_a \ldots R_C'$ in Equations 14–22 for the particular values of $R_0 \ldots R_9$. More specifically, Equations 4 and 5 are first solved for $R_0$ and $R_1$, and then Equation 14 is solved for $R_a$. Equation 6 is then solved for $R_2$ and then Equation 15 is solved for $R_b$, etc.

OPERATION OF THE PARITY CALCULATOR 10—FIG. 2

To more readily understand the present invention, the operation of the parity calculator 10 of FIG. 2 to derive the value of $R_C'$ in Equation 22 for specific values of $a_0 \ldots a_9$ will now be described. For the purposes of discussion, the values of $a_0 \ldots a_9$ listed below will be assumed. From Equation 1, with the values of $a_0 \ldots a_9$ listed below, $R_C = 3$.

| Digit position: | Decimal and binary values of $a_0 \ldots a_9$ |
|---|---|
| 0 | $a_0=9$ (1001) |
| 1 | $a_1=8$ (1000) |
| 2 | $a_2=3$ (0011) |
| 3 | $a_3=2$ (0010) |
| 4 | $a_4=6$ (0110) |
| 5 | $a_5=0$ (0000) |
| 6 | $a_6=4$ (0100) |
| 7 | $a_7=7$ (0111) |
| 8 | $a_8=1$ (0001) |
| 9 | $a_9=5$ (0101) |

Figure 4:
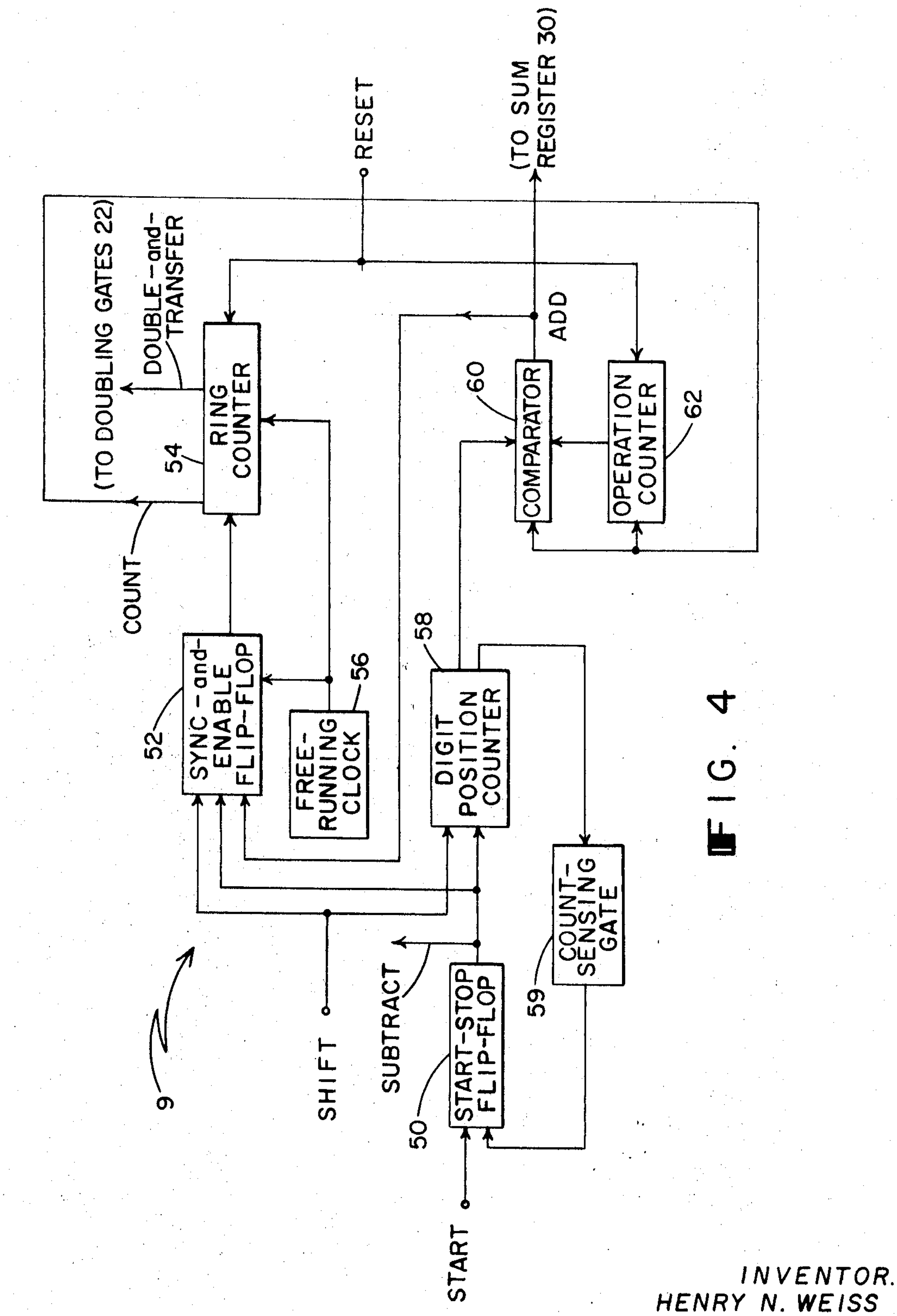
FIG. 4 is a schematic block diagram representation of a control arrangement for controlling the operations of the parity-checking apparatus employed in the coded-vehicle identification systems of FIGS. 1 and 3.

Referring to FIG. 2, the four-bit binary-coded signal representative of the digit $a_0=9$ (1001) is shifted into and stored in the input register 20 by a SHIFT signal applied to the input register 20 from the logic and code converter unit 6. Typically, the input register 20 comprises four flip-flop stages of conventional construction, one stage for each of the four bits of a signal representative of a digit applied to the input register 20. An ADD signal from the control arrangement 9, to be discussed in greater detail in conjunction with FIG. 4, is then applied to the sum register 30, comprising four flip-flop stages, to cause the binary contents of the sum register 30, initially zero, to be transferred to the base-11 binary adder 24 via the feedback path therebetween. Since no DOUBLE-and-TRANSFER signal is applied to the doubling gates 22, the contents of the input register 20 are applied directly to the base-11 binary adder 24, and added to the contents of the sum register 30. It may be noted that no doubling of the value of the binary-coded signal representing the first digit $a_0$ takes place in the doubling gates 22 inasmuch as only the operation $a_0 2^0$ $(9\times1)$, corresponding to Equation 4, is performed in the doubling gates 22. As will become apparent hereinafter, a doubling operation takes place only when the value of a binary-coded signal stored in the input register 20 and representative of a digit is to be multiplied by 2 raised to a power of 1 through 9 (corresponding to Equations 5–13). In those instances, a corresponding number (1 . . . 9) of DOUBLE-and-TRANSFER signals are applied to the doubling gates 22 to initiate the appropriate multiplying operations.

As mentioned above, the contents of the sum register 30 and the input register 20 are added in the binary adder 24. Since the sum register 30 is initially empty, that is, the sum register 30 initially contains a binary-coded signal having a value of 0 (0000), the binary adder 24 adds the digit values of 0 and 9 and applies a resulting binary-coded digit having a value of 9 (1001) to the sum register 30. This binary-coded digit having a value of 9 corresponds to $R_0$ in Equation 4. After the addition of the contents of the sum register 30 and the contents of the input register 20 is accomplished, a RESET signal from the logic and code converter unit 6, FIG. 1, is applied to the input register 20 to clear the stages thereof in preparation for receiving the next binary-coded signal representative of the digit $a_1$.

The binary-coded signal representative of the second digit $a_1=8$ is shifted into and stored in the input register 20 by another SHIFT signal applied to the input register 20. A DOUBLE-and-TRANSFER signal from the control arrangement 9 is then applied to the doubling gates 22 to cause the value of the binary-coded signal representative of the second digit $a_1$ to be doubled in a binary fashion (corresponding to $a_1 2^1$ in Equation 5). Typically, the DOUBLE-and-TRANSFER signal is a single pulse, the leading edge of which initiates the doubling operation, the actual doubling operation taking place during the time of the DOUBLE-and-TRANSFER pulse. Thus, in the above situation, a coded digit having a value of 16 (10000) is applied to the base-11 binary adder 24. However, the entire value of 16 is not accepted by the binary adder 24. Since the binary adder 24 operates in base-11, an amount or quantity equal to 11 (corresponding to the divisor 11 in Equations 1–22) is automatically subtracted from the value 16, causing the binary adder 24 to produce a coded digit having a value of 5. This automatic subtraction of 11 is typically accomplished in the base-11 binary adder 24 by count-sensing gates (not shown) included in the binary adder 24 which sense digit values of 11 and greater and which, in response to sensing a digit value of 11 or greater, cause an amount equal to 11 to be subtracted from the value of the digit. Alternatively, count-sensing gates may be provided in the doubling gates 22 for accomplishing the same purpose. Thus, in the above-described situation, when a binary-coded digit having a value of 16 is applied to the binary adder 24, a count having a value of 5 only (16—11) is generated by the binary adder 24. This value of 5 corresponds to $R_1$ in Equation 5.

On the trailing edge of the DOUBLE-and-TRANSFER signal, the output digit of the binary adder 24, representing a derivative of the coded signal representative of the digit $a_1$, is transferred to the input register 20. This transfer is accomplished by the trailing edge of the DOUBLE-and-TRANSFER signal enabling the input register 20 whereby the output of the binary adder 24 is transferred directly to the input register 20 together with its complement as provided by the plurality of inverter gates 26. The effect of the direct application of the output of the binary adder 24 together with its complement to the input register 20 is to alter the states of the stages of the input register 20 in a conventional fashion to store therein a binary-coded digit having a value of 5. Subsequent to the DOUBLE-and-TRANSFER signal, an ADD signal from the control arrangement 9 is applied to the sum register 30. In response thereto, the binary contents of the sum register 30 ($R_0=9=1001$) is added in the binary adder 24 to the existing contents of the input register 20 ($R_1=5=0101$) as directly applied to the binary adder 24 through the doubling gates 22 without doubling (no DOUBLE-and-TRANSFER signal). Since 9+5 yields 14 (1110), which exceeds 11, an amount equal to 11 is automatically subtracted therefrom by the binary adder 24 in the manner described hereinabove whereby the binary adder 24 generates a coded digit having a value of 3, which coded digit is directly applied to the sum register 30. The digit value of 3 corresponds to $R_a$ in Equation 14.

After the input register 20 is reset by another RESET signal from the logic and code converter unit 6, the binary-coded signal representative of the third digit $a_2=3$ (0011) is shifted into and stored in the input register 20. A first of two DOUBLE-and-TRANSFER signals from the control arrangement 9 is then applied to the doubling gates 22 to cause the value of the binary-coded signal representative of the third digit $a_2$ to be doubled by the doubling gates 22, in the manner previously described. A binary-coded digit having a value of 6 (0110) is thus entered into the binary adder 24. Since 6 is less than 11, a digit having a value of 6 is generated by the binary adder 24. On the trailing edge of the DOUBLE-and-TRANSFER signal, the digit 6, constituting a first derivative of the coded signal representative of the digit $a_2$, is transferred from the binary adder 24 to the input register 20 in the above-described manner.

The second of the two DOUBLE-and-TRANSFER signals is then applied to the doubling gates 22 to cause the value of the binary-coded digit now present in the input register 20 (i.e., the derivative binary-coded digit having a value of 6) to be doubled by the doubling gates 22 whereby a binary-coded digit having a value of 12 (1100) is applied to the binary adder 24. Since 12 exceeds 11, an amount equal to 11 is automatically subtracted from the 12 in the binary adder 24, whereby a binary-coded digit having a value of 1 (0001) is generated by the binary adder 24. This coded digit constitutes a second derivative of the coded signal representative of the digit $a_2$. Also, the value of 1 corresponds to $R_2$ in Equation 6. On the trailing edge of the second DOUBLE-and-TRANSFER signal, the binary-coded digit generated by the binary adder 24 and having the value of 1 is transferred to the input register 20. An ADD signal is then applied to the sum register 30 to cause its contents ($R_a=3=0011$) to be added in the binary adder 24 to the contents $$(R_2=1=0001)$$

of the input register 20, the resulting binary-coded digit having a value of 4 (0100) being applied by the binary adder 24 to the sum register 30 and stored therein. The value of 4 corresponds to $R_b$ in Equation 15.

After the input register 20 is reset by another RESET signal from the code converter 6, the binary-coded signal representative of the fourth digit $a_3=2$ (0010) is shifted into and stored in the input register 20. A first of three DOUBLE-and-TRANSFER signals from the control arrangement 9 is then applied to the doubling gates 22 to cause the value of the binary-coded signal representative of the fourth digit $a_3$ to be doubled by the doubling gates 22. A binary-coded digit having a value of 4 (0100) is thus entered into the binary adder 24. Since 4 is less than 11, a coded digit having a value of 4 is generated by the binary adder 24, which digit is transferred to the input register 20 on the trailing edge of the first DOUBLE-and-TRANSFER signal. The 4 digit constitutes a first derivative of the coded signal representative of the digit $a_3$.

The second of the three DOUBLE-and-TRANSFER signals is then applied to the doubling gates 22 to cause the 4 in the input register 20 to be doubled whereby a binary-coded digit having a value of 8 (1000) is applied to the binary adder 24. Since 8 is less than 11, a coded digit having a value of 8 is generated by the binary adder 24, which coded digit is transferred to the input register 20 on the trailing edge of the second DOUBLE-and-TRANSFER signal. The 8 digit constitutes a second derivative of the coded signal representing the digit $a_3$.

The last of the three DOUBLE-and-TRANSFER signals is then applied to the doubling gates 22 to cause the 8 in the input register to be doubled whereby a binary-coded digit having a value of 16 (10000) is applied to the binary adder 24. Since 16 exceeds 11, an amount equal to 11 is automatically subtracted from the 16 whereby the binary adder 24 generates a coded digit having a value of 5 (0101). The 5-digit constitutes the third and last derivative of the coded signal representative of the digit $a_3$. Also, the value of 5 corresponds to $R_3$ in Equation 7. The binary-coded digit having a value of 5 is then transferred to the input register 20 on the trailing edge of the third DOUBLE-and-TRANSFER signal. An ADD signal is then applied to the sum register 30 to cause the contents thereof ($R_b=4=0100$) to be added in the binary adder 24 to the contents ($R_3=5=0101$) of the input register 20. The resulting binary coded digit, having a value of 9 (1001) and corresponding to $R_c$ in Equation 16, is applied by the binary adder 24 to the sum register 30.

In the same manner as described above, the coded signals representative of the digits $a_4$ through $a_9$ are shifted in sequence into the input register 20 and the various arithmetic operations performed thereon by the doubling gates 22 and the binary adder 24 as described hereinabove. Thus, after the binary-coded signal representative of the fifth digit $a_4=6$ is shifted into the input register 20, a series of four DOUBLE-and-TRANSFER signals (corresponding to $2^4$ in Equation 8) are applied in sequence to the doubling gates 22 and four derivative signals are produced in the manner described hereinabove. After the binary-coded signal representative of the sixth digit $a_5=0$ is shifted into the input register 20, a series of five DOUBLE-and-TRANSFER signals (corresponding to $2^5$ in Equation 9) are applied in sequence to the doubling gates 22 and five derivative signals are produced, etc. If at any time the value of a binary-coded digit entered into the binary adder 24 equals or exceeds 11, either as a result of doubling the contents of the input register 20, or adding the contents of both the sum register 30 and the input register 20 in the binary adder 24, an amount equal to 11 is subtracted from the value of the binary-coded digit entered into the binary adder 24.

By performing the various arithmetic operations on the binary-coded signals representative of the remaining digits $a_4$ through $a_9$, the following values of $R_4$ through $R_9$ (Equations 8 through 12), and of $R_d$ through $R_C'$ (Equations 17 through 22) may be derived

| | |
|---|---|
| $R_4=8$ (1000) | $R_d=6$ (0110) |
| $R_5=0$ (0000) | $R_e=6$ (0110) |
| $R_6=3$ (0011) | $R_f=9$ (1001) |
| $R_7=5$ (0101) | $R_g=3$ (0011) |
| $R_8=6$ (0110) | $R_h=9$ (1001) |
| $R_9=5$ (0101) | $R_C'=3$ (0011) |

VERIFICATION OF CODE INFORMATION—FIG. 2

After a value of $R_C'$ is derived, to verify the code information derived from the label 3 by the scanning apparatus 2, FIG. 1, the binary (four-bit) coded signal representative of the parity check integer $R_C$ is shifted into the input register 20 by a SHIFT signal from the logic and code converter unit 6 and also into the binary adder 24 (no doubling taking place), and a SUBTRACT signal from the control arrangement 9 is applied to the plurality of inverter gates 32 and to the plurality of output gates 28. The effect of the SUBTRACT signal applied to the plurality of inverter gates 32 is to cause the contents of the sum register 30 ($R_C'=3=0011$), representing the calculated parity, to be inverted by the plurality of inverter gates 32.

The inverter output signal of the inverter gates 32 (1100) is applied to the binary adder 24 and added to the binary-coded signal representative of the parity check integer ($R_C=3=0011$) applied to the binary adder 24 from the input register 20. The adding operation is equivalent to subtracting the binary-coded signal representative of the calculated parity $R_C'$ from the coded signal representative of the parity check integer $R_C$. If the result of the addition of the two signals in the binary adder 24 is a 1111 ($0011+1100=1111=15$), indicating that the coded information has been properly and correctly received from the coded label 3, a coded signal, 0100 ($15-11=4=0100$), is produced by the binary adder 24 and applied to the plurality of output gates 28. The coded 0100 signal from the binary adder 24 is gated through the plurality of output gates 28 to the plurality of storage registers 8 by the SUBTRACT signal applied thereto whereby the $a_0 \ldots a_9$ and $R_C$ coded signals stored in the registers 8 are transferred into the code converter 11. If the result of the addition of the two digital signals in the binary adder 24 is something other than 0100, indicating that the coded information derived from the coded label 3 has been improperly or incorrectly received, no output signal is produced by the plurality of gates 28 and applied to the plurality of storage registers 8. Consequently, the code converter 11, the serializer 12, and the output apparatus 14 of FIG. 1 are rendered inoperative.

CODED-VEHICLE IDENTIFICATION SYSTEM—FIG. 3

Figure 3:
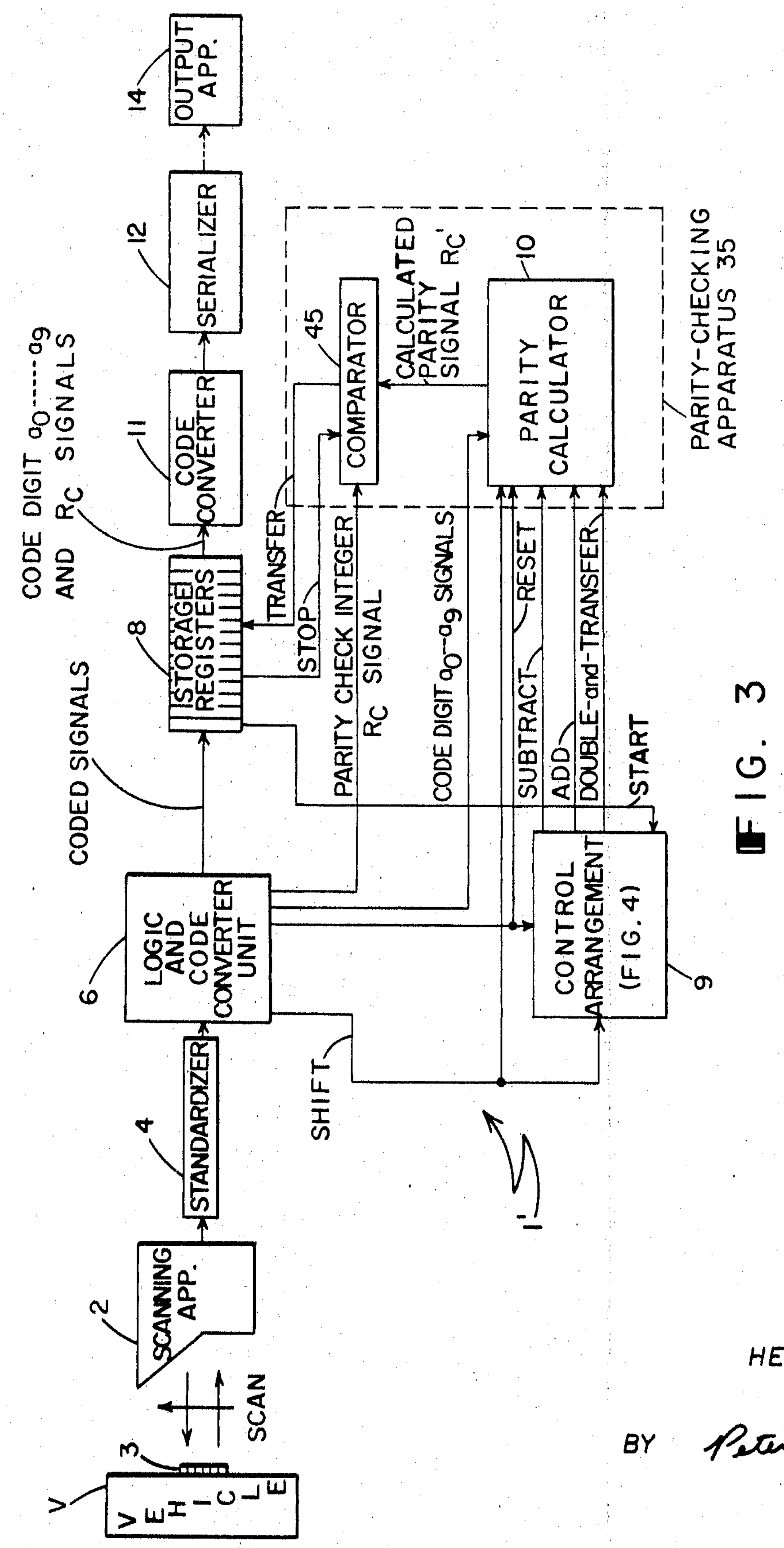
FIG. 3 is a schematic block diagram representation of a coded-vehicle identification system employing parity-checking apparatus in accordance with an alternative embodiment of the invention.

FIG. 3 illustrates in a schematic block diagram form a coded-vehicle identification system 1' employing a parity-checking apparatus 35 in accordance with an alternative embodiment of the invention. The vehicle identification system 1' of FIG. 3 differs physically from that shown in FIG. 1 in that the vehicle identification system 1' additionally includes a comparator 45 and, furthermore, no inverter gates 32 or output gates 28 as shown in FIG. 2 are required. Where the elements of FIG. 3 are the same as in FIG. 1, the same reference numerals have been employed.

The operation of the vehicle identification system 1' of FIG. 3 is similar to the operation of the vehicle identification system 1 of FIG. 1. However, in the vehicle identification system 1' of FIG. 3, only the binary-coded signals representative of the digits $a_0 \ldots a_9$ are applied to the parity calculator 10. That is, the binary-coded signal representative of the parity check integer $R_C$ is not applied to the parity calculator 10 as was the case in the vehicle identification system 1 of FIG. 1. Instead, the binary-coded signal representative of the parity check integer $R_C$ is applied to an input of the comparator 45. In operation, the parity calculator 10 of FIG. 3 calculates the value of parity $R_C'$ corresponding to the selected values of the digits $a_0 \ldots a_9$, and produces a binary-coded signal representative thereof at the output of the sum register 30, FIG. 2. To verify whether the code information was properly and correctly derived from the label 3 by the scanning apparatus 2, the binary-coded output signal of the parity calculator 10, $R_C'$, is applied to the comparator 45 together with the coded signal representative of the parity check integer $R_C$ (from the logic and code converter unit 6). Upon receipt of a signal representative of the STOP control word from one of the storage registers 8, the coded signals representative of $R_C$ and $R_C'$ are compared in the comparator 45. If the values of the two signals compare, thereby indicating that the information was properly and correctly derived from the coded label 3, an output signal is produced by the comparator 45 and applied to the plurality of storage registers 8 to cause the stored coded signals representative of the digits $a_0 \ldots a_9$ and the parity check integer $R_C$ to be transferred to the code converter 11 as previously described. If the values of the coded signals in the comparator 45 do not compare, an output signal is produced by the comparator 45 and applied to the plurality of storage registers 8 preventing the transfer of coded signals therefrom. Consequently, the code converter 11, the serializer 12, and the output apparatus 14 are rendered inoperative.

CONTROL ARRANGEMENT 9—FIG. 4

FIG. 4 shows in greater detail the control arrangement 9 of FIGS. 1 and 3. As shown in FIG. 4, the control arrangement 9 comprises: a start-stop flip-flop 50 operable to initiate operation of the control arrangement 9; a digit position counter 58; a count-sensing gate 59 operable to sense the count in the digit position counter 58; a ring counter 54 controlled by a sync-and-enable flip-flop 52 and operable to count signals from a free-running clock 56; an operation counter 62; and a comparator 60 adapted to compare the counts in the digit position counter 58 and the operation counter 62.

The operation of the control arrangement 9 is as follows. A signal representative of the coded START signal stored in one of the storage registers 8 is applied to the start-stop flip-flop 50 to set the start-stop flip-flop 50 to its enabling state, and a RESET signal is applied to the ring counter 54 and to the operation counter 62 to establish an initial count of 0 in each of the counters 54 and 62.

A first SHIFT signal is then applied by the logic and code converter unit 6 to the digit position counter 58 following the generation by the logic and code converter unit 6 of the binary-coded signal representative of the first digit $a_0$. Initially, that is, prior to the application of the first SHIFT signal, the digit position counter 58 is adapted to contain a count of 15 such that the first SHIFT signal applied thereto causes the count of 15 to go to 0 and to thereby correspond with the 0 position of the first digit $a_0$. The first SHIFT signal is also applied to the sync-and-enable flip-flop 52 to cause the ring counter 54 to be enabled thereby, and to count in a ring fashion the pulses of the free-running clock 56. The signals from the free-running clock 56 additionally serve to synchronize the operations of the sync-and-enable flip-flop 52 and the ring counter 54.

After the first clock pulse from the free-running clock 56 is counted by the ring counter 54, a COUNT pulse is produced by the ring counter 54 and applied both to the comparator 60 and to the operation counter 62. The operation counter 62 serves to count the number of doubling operations performed on each of the signals representative of one of the digits $a_0 \ldots a_9$ in the parity calculator 10. Thus, for the binary-coded signal representative of the first digit $a_0$, the value of which is multiplied by $2^0$, a count of 0 is contained in the operation counter 62 inasmuch as no doubling of the value of the coded signal representative of the digit $a_0$ is performed. On the leading edge of the COUNT pulse, a comparison between the count of the digit position counter 58 and the count of the operation counter 62 is made in the comparator 60. Since the count in the digit position counter 58 is the same as the count in the operation counter 62, that is, 0, an ADD signal is produced by the comparator 60 and applied to the sum register 30, (FIG. 2), as previously described. The ADD signal is also applied to the sync-and-enable flip-flop 52 to reset the flip-flop 52 and to inhibit further counting by the ring counter 54. On the trailing edge of the COUNT signal, the count of the operation counter 62 is advanced from 0 to 1.

After the first ADD signal has been generated, a second RESET signal is applied to the operation counter 62 and to the ring counter 54 to again set both counters to a count of 0. A second SHIFT signal, corresponding to the second digit $a_1$, is then applied by the logic and code converter unit 6 to the digit position counter 58 and to the sync-and-enable flip-flop 52. The count of the digit position counter 58 is advanced to a count of 1 and the ring counter 54 is caused to again commence counting of the pulses from the free-running clock 56. As before, a COUNT signal is generated by the ring counter 54 and applied to the comparator 60 and to the operation counter 62. Since the count in the digit position counter 58 at this time is 1 and the count in the operation counter 62 is 0 (because of resetting, no ADD signal is generated at this time on the leading edge of the COUNT signal by the comparator 60. Furthermore, the sync-and-enable flip-flop 52, which its reset by an ADD signal, is not reset, and the ring counter, therefore, continues to count the pulses of the free-running clock 56. On the trailing edge of the COUNT signal, the count of the operation counter 62 is advanced from 0 to 1.

The second signal produced by the ring counter 54 is a DOUBLE-and-TRANSFER signal which is applied to the doubling gates 22 to allow doubling of the value of the binary-coded signal representative of the second digit $a_1$ as previously described. A second COUNT signal is then generated by the ring counter 54 and applied to the comparator 60 and to the operation counter 62. Since the count in the digit position counter 58 at this time is 1 and since the count of the operation counter 62 was advanced to 1 on the trailing edge of the previous COUNT signal, the two counts compare and an ADD signal is generated by the comparator 60 and applied to the sum register 30. The ADD signal is also applied to the sync-and-enable flip-flop 52 to reset the flip-flop 52 and to inhibit further counting by the ring counter 54. Additionally, the ring counter 54 and the operation counter 62 are set to a count of 0 by another RESET signal.

After the ADD signal corresponding to the second digit $a_1$ has been generated, a third SHIFT signal corresponding to the third digit $a_2$ is applied by the logic and code converter unit 6 to the digit-position counter 58 to advance the count thereof to 2 and to enable the sync-and-enable flip-flop 52 whereby the ring counter 54 again commences counting the pulses from the free-running clock 56. The ring counter 54 operates in the above-described manner until three COUNT signals and two DOUBLE-and-TRANSFER signals (the latter corresponding to $2^2$) have been generated thereby. Each of the three COUNT signals is applied to the comparator 60 and to the operation counter 62 in the manner previously described with the result that an ADD signal is generated by the comparator 60 on the leading edge of the third COUNT signal. The sync-and-enable flip-flop 52 is then reset again by the ADD signal so produced, and the ring counter 54 and the operation counter 62 are reset to 0 by a RESET signal applied to each.

In the same manner as described hereinabove, when appropriate SHIFT signals corresponding to the remaining digits $a_3 \ldots a_9$ are applied by the logic and code converter unit 6 to the digit position counter 58 and to the sync-and-enable flip-flop 52, the ring counter 54 operates to count the pulses from the free-running clock 56 and to alternately generate COUNT and DOUBLE-and-TRANSFER signals until the count in the digit position counter 58 is the same as the count in the operation counter 62. For example, for the fourth digit $a_3$, four COUNT signals and three DOUBLE-and-TRANSFER signals (the latter corresponding to $2^3$) are produced by the ring counter 54. For the fifth digit $a_4$, five COUNT signals and four DOUBLE-and-TRANSFER signals (the latter corresponding to $2^4$) are produced, etc. After the coded signal representative of the digit $a_9$ has been processed, the count in the digit position counter 58 is at 9. This count of 9 is sensed by the count-sensing gate 59 to reset the start-stop flip-flop 50 whereby the operation of the control arrangement 9 is terminated. When the control arrangement 9 of FIG. 4 is used to control the operation of the parity-checking apparatus 7 of FIG. 2, a SUBTRACT signal is additionally generated by the start-stop flip-flop 50 and applied to the inverter gates 32 and to the output gates 28 and treated in the manner previously described.

MODIFICATIONS

Various modifications are possible in the above-described calculator 10. For example, by generalizing Equation 1 to $$\frac{a_0x^0+a_1x^1+\ .\ .\ .\ a_nx^n}{K}=I+\frac{R}{K}$$

as previously indicated multiplication by successively increasing powers of $x$ and modulo-K operation are possible. In this generalized case, the appropriate number of register stages, gates, added stages, etc. are provided to accommodate the particular values of $x$ and K. Additionally, the control arrangement of 9 of FIG. 4 is appropriately modified to provide the required timing and control signals for the parity calculator.

It will now be apparent that coded-vehicle identification systems employing novel parity-checking and parity calculating apparatus have been disclosed in such full, clear, concise and exact terms as to enable any person skilled in the art to which they pertain to make and use the same. It will also be apparent that various changes and modifications may be made in form and detail by those skilled in the art without departing from the spirit and scope of the invention. Therefore, it is intended that the invention shall not be limited except as by the appended claims.

What is claimed is:

1. A calculator apparatus comprising:

storage means adapted to store an input signal having a given value;

multiplying means operable to multiply the value of said input signal by a first predetermined quantity and to produce a product signal having a value equal to the product;

arithmetic means operable to subtract from the value of said product signal from said multiplying means an amount equal to a second predetermined quantity if the value of said product signal from said multiplying means is equal to or greater than said second predetermined quantity and to produce an output signal having a value equal to the difference, or operable to produce an output signal having a value equal to the value of said product signal from said multiplying means if said product signal has a value less than said second predetermined quantity;

means operable to transfer the output signal from said arithmetic means to said storage means whereby said output signal is stored in said storage means;

said multiplying means being further operable to multiply the value of said output signal stored in said storage means by said first predetermined quantity and to produce a second product signal having a value equal to the product; and said arithmetic means being further operable to subtract from the value of said second product signal from said multiplying means an amount equal to said second predetermined quantity if the value of said second product signal from said multiplying means is equal to or greater than said second predetermined quantity and to produce a second output signal having a value equal to the difference, or operable to produce a second output signal having a value equal to the value of said second product signal from said multiplying means if said second product signal has a value less than said second predetermined quantity.

2. A calculator apparatus comprising:

first storage means adapted to receive and to store in succession a plurality of input signals, each of the plurality of input signals having a given number assigned thereto, said number including 0, and a given value;

multiplying means operable to perform multiplication operations on signals received in said first storage means and to produce product signals therefrom;

adder means operable to receive product signals from said multiplying means and to produce output signals at an output thereof;

second storage means connected to the adder means and adapted to receive and store the last output signal produced by the adder means in connection with operations performed thereby relating to each of the input signals applied to the first storage means;

transfer means coupled between the output of said adder means and said first storage means;

said multiplying means and adder means jointly cooperating to produce a series of derivative signals from each of the plurality of input signals at the output of said adder means, the number of derivative signals in a series being equal to the number assigned to the input signal from which the series of derivative signals is produced;

said transfer means being operable to transfer each of the derivative signals in each series in succession from the output of said adder means to said first storage means to be received and stored therein, each derivative signal of a series being stored in said first storage means subsequent to the storage of the input signal from which the series is derived;

said multiplying means being operable to multiply the value of each of the plurality of input signals and each derivative signal produced from each of the plurality of input signals by a first predetermined quantity, the total number of multiplying operations associated with each of the plurality of input signals being equal to the number assigned to the input signal, and operable to produce a product signal having a value equal to the product;

said adder means being operable to subtract from the value of each of the product signals an amount equal to a second predetermined quantity if the value of the product signal is equal to or greater than said second predetermined quantity and to produce a derivative signal having a value equal to the difference, or operable to produce a derivative signal having a value equal to the value of the product signal if the product signal has a value less than said second predetermined quantity;

said adder means being further operable, after the last derivative signal in each series is produced from an input signal and transferred into and stored in said first storage means, to add the value of the signal present in the first storage means to the value of the signal then present in said second storage means and representing the value of the last output signal received from the output of the adder means in connection with the preceding series of derivative signals and, if the value of the sum is equal to or greater than said second predetermined quantity, to subtract an amount therefrom equal to said second predetermined quantity and to produce to said second storage means a signal having a value equal to the difference, or, if the value of the sum is less than said second predetermined quantity, to produce to said second storage means a signal having a value equal to the sum.

3. A calculator apparatus in accordance with claim 2 wherein the number of input signals in the plurality of input signals is $m$, and each of the $m$ input signals has a number 0 . . . $(m-1)$ assigned thereto, said number corresponding to the position of the input signal in the $m$ input signals.

4. A calculator apparatus in accordance with claim 3 wherein each of the $m$ input signals has a value of 0 . . . 9, the first predetermined quantity is 2, and the second predetermined quantity is 11.

5. A calculator apparatus comprising:

first storage means adapted to receive and to store in succession $m$ input signals, each of said $m$ input signals having a corresponding position number 0 . . . ($m$—1) assigned thereto and a given value;

second storage means adapted to store signals;

multiplying means operable to pass therethrough, without changing the value thereof, the 0-position input signal received in said first storage means;

adder means operable to receive the 0-position input signal and to produce at an output thereof an output signal having a value equal to the value of the 0-position input signal, said adder means applying said output signal to said second storage means to be stored therein; and transfer means coupled between the output of said adder means and said first storage means;

said multiplying means and adder means jointly cooperating to produce at the output of said adder means a series of successive derivative signals from each of the other ones of said $m$ input signals received in succession in said first storage means, the number of derivative signals in each series produced from each of the other ones of said $m$ input signals being equal to the position number assigned thereto;

said transfer means being operable to transfer each of the derivative signals in each series in succession from the output of said adder means to said first storage means to be received and stored therein, each derivative signal of a series being stored in said first storage means subsequent to the storage of the input signal from which the series is derived;

said multiplying means being operable to multiply the value of each of said other ones of said $m$ input signals stored in said first storage means and each of the derivative signals produced therefrom except the last derivative signal in each series by a first predetermined quantity, and to produce a product signal having a value equal to the product;

said adder means being operable to subtract from the value of each of the product signals from the multiplying means a sum equal to a second predetermined quantity if the value of the product signal is equal to or greater than said second predetermined quantity and to produce a derivative signal at the output thereof having a value equal to the difference, or operable to produce a derivative signal at the output thereof having a value equal to the value of the product signal if the product signal has a value less than said second predetermined quantity;

said adder means being further operable, after the last derivative signal in each series is produced from each of said other ones of said $m$ input signals and transferred into and stored in said first storage means, to add the value of said last derivative signal to the value of the signal then present in said second storage means and, if the value of the sum is equal to or greater than said second predetermined quantity, to substract an amount therefrom equal to said second predetermined quantity and to provide to said second storage means a signal having a value equal to the difference, or, if the value of the sum is less than said second predetermined quantity, to provide to said second storage means a signal having a value equal to the sum.

6. A calculator apparatus in accordance with claim 5 wherein each of the $m$ input signals has a value of 0 . . . 9, the first predetermined quantity is 2, and the second predetermined quantity is 11.

7. A parity-checking apparatus comprising:

first storage means adapted to receive and to store in succession $m$ input signals, each of said $m$ input signals having a corresponding position number 0 . . . ($m$—1) assigned thereto and a given value, and a parity signal having a given value;

second storage means adapted to store signals;

multiplying means operable to pass therethrough, without changing the value thereof, the 0-position input signal received in said first storage means;

adder means operable to receive the 0-position input signal and to produce at an output thereof an output signal having a value equal to the value of the 0-position input signal, said adder means applying said output signal to said second storage means;

transfer means coupled between the output of said adder means and said first storage means;

said multiplying means and adder means jointly cooperating to produce at the output of said adder means a series of successive derivative signals from each of the other ones of the $m$ input signals received in succession in said first storage means, the number of derivative signals in each series produced from each of the other ones of the $m$ input signals being equal to the position number assigned thereto;

said transfer means being operable to transfer each of the derivative signals in each series in succession from the output of said adder means to said first storage means to be received and stored therein, each derivative signal of a series being stored in said first storage means subsequent to the storage of the input signal from which the series is derived;

said multiplying means being operable to multiply the value of each of the other ones of the $m$ input signals stored in said first storage means and each of the derivative signals produced therefrom except the last derivative signal in each series by a first predetermined quantity, and to produce a product signal having a value equal to the product;

said adder means being operable to subtract from the value of each of the product signals from the multiplying means an amount equal to a second predetermined quantity if the value of the product signal is equal to or greater than said second predetermined quantity and to produce a derivative signal at the output thereof having a value equal to the difference, or operable to produce a derivative signal at the output thereof having a value equal to the valve of the product signal if the product signal has a value less than said second predetermined quantity;

said adder means being further operable, after the last derivative signal in each series is produced from each of the other ones of the $m$ input signals and transferred into and stored in said first storage means, to add the value of said last derivative signal to the value of the signal then present in said second storage means and, if the value of the sum is equal to or greater than said second predetermined quantity, to subtract an amount therefrom equal to said second predetermined quantity and to provide to said second storage means a signal having a value equal to the difference, or, if the value of the sum is less than said second predetermined quantity, to provide to said second storage means a signal having a value equal to the sum; and inverter means operable to provide to said adder means a complement of the signal last stored in said second storage means;

said multiplying means being operable to pass therethrough to said adder means without changing the value thereof, the parity signal:

said adder means beiny operable to add the complemented signal and the parity signal and to produce a first signal condition if the sum of the values of the complemented and parity signals is equal to a predetermined value, or to produce a second signal condition if the sum of the values of the complemented and parity signals is other than said predetermined value.

8. A parity-checking apparatus in accordance with claim 7 wherein each of the $m$ input signals has a value of 0 . . . 9, the first predetermined quantity is 2, the second predetermined quantity is 11, and the parity signal and the last signal stored in said second storage means each have a value of 0 . . . 10.

9. A parity checking apparatus comprising:

first storage means adapted to receive and to store in succession $m$ input signals, each of the $m$ input signals having a corresponding position number 0 . . . ($m$—1) assigned thereto and a given value;

second storage means adapted to store signals;

multiplying means operable to pass therethrough, without changing the value thereof, the 0-position input signal received in said first storage means;

adder means operable to receive the 0-position input signal and to produce at an output thereof an output signal having a value equal to the value of the 0-position input signal, said adder means applying said output signal to said second storage means;

transfer means coupled between the output of said adder means and said first storage means;

said multiplying means and adder means jointly co-operating to produce at the output of said adder means a series of successive derivative signals from each of the other ones of the $m$ input signals received in succession in said first storage means, the number of derivative signals in each series produced from each of the other ones of said $m$ input signals being equal to the position number assigned thereto;

said transfer means being operable to transfer each of the derivative signals in each series in succession from the output of said adder means to said first storage means to be received and stored therein, each derivative signal of a series being stored in said first storage means subsequent to the storage of the input signal from which the series is derived;

said multiplying means being operable to multiply the value of each of the other ones of the $m$ input signals stored in said first storage means and each of the derivatives signals produced therefrom except the last derivative signal in each series by a first predetermined quantity, and to produce a product signal having a value equal to the product;

said adder means being operable to subtract from the value of each of the product signals from the multiplying means an amount equal to a second predetermined quantity if the value of the product signal is equal to or greater than said second predetermined quantity and to produce a derivative signal at the output thereof having a value equal to the difference, or operable to produce a derivative signal at the output thereof having a value equal to the value of the product signal if the product signal has a value less than said second predetermined quantity;

said adder means being further operable, after the last derivative signal in each series is produced from each of the other ones of the $m$ input signals and transferred into and stored in said first storage means, to add the value of said last derivative signal to the value of the signal then present in said second storage means and, if the value of the sum is equal to or greater than said second predetermined quantity, to subtract an amount therefrom equal to said second predetermined quantity and to provide to said second storage means a signal having a value equal to the difference, or, if the value of the sum is less than said second predetermined quantity, to provide to said second storage means a signal having a value equal to the sum; and comparator means adapted to receive a parity signal having a given value and the signal last stored in said second storage means and to compare said signals, said comparator means producing a first output signal if said signals bear a predetermined relaship to each other or a second output signal if said signals do not bear the predetermined relationship to each other.

10. A parity-checking apparatus in accordance with claim 9 wherein each of the $m$ input signals has a value of 0 . . . 9, the first predetermined quantity is 2, the second predetermined quantity is 11, and the parity signal and the last signal stored in said second storage means each have a value of 0 . . . 10.

11. In a coded-vehicle identification system including a vehicle on which a coded retroreflective label is disposed, said label being coded to represent a plurality of integers $a_0 \ldots a_n$, each integer having a given value, and a parity check integer having a value related to the values of the plurality of integers $a_0 \ldots a_n$, apparatus comprising:

means adapted to acquire from said coded label a plurality of signals representative of the plurality of integers $a_0 \ldots a_n$, each of the plurality of signals having a value corresponding to the value of the associated integer, and a parity signal representative of the parity check integer, said parity signal having a value corresponding to the value of the parity check integer; and parity-checking apparatus comprising:

(a) calculator means operable to receive the plurality of signals representative of the plurality of integers $a_0 \ldots a_n$ and the parity signal representative of the parity check integer, and to calculate from the plurality of signals representative of the integers $a_0 \ldots a_n$ a value for the remainder R in $$\frac{a_0x^0+a_1x^1+\ldots+a_nx^n}{K}=I+\frac{R}{K}$$

where $x$ and $k$ are integers and I is an integer representing the maximum number of times that the numerator $a_0x^0+a_1x^1 \ldots +a_nx^n$ is divisible by K, and to produce an output signal having a value equal to the value of R; and (b) inverter means operable to provide to said calculator means a complement of the output signal produced by said calculator means, said calculator means being further operable to add the complemented signal and the parity signal and to produce a first signal condition if the sum of the values of the complemented and parity signals is equal to a predetermined value, or to produce a second signal condition if the sum of the values of the complemented and parity signals is other than said predetermined value.

12. In a coded-vehicle identification system including a vehicle on which a coded label is disposed; said label being coded to represent a plurality of integers $a_0 \ldots a_n$, each integer having a given number assigned thereto, said number including 0, and each of said plurality of integers $a_0 \ldots a_n$ having a given value; and a parity check integer having a value related to the values of the plurality of integers $a_0 \ldots a_n$, apparatus comprising:

means adapted to acquire from said coded label a plurality of signals representative of the plurality of integers $a_0 \ldots a_n$, each of the plurality of signals having an assigned number and a value corresponding to the assigned number and value of the associated integer, and a parity signal representative of the parity check integer, said parity signal having a value corresponding to the value of the parity check integer;

a plurality of data storage means adapted to receive and to retain said plurality of signals representative of said plurality of integers $a_0 \ldots a_n$;

first storage means adapted to receive and to store in succession the plurality of signals representative of the integers $a_0 \ldots a_n$ and the parity signal;

second storage means adapted to store signals;

multiplying means operable to perform multiplication operations on signals received in said first storage means and to produce product signals therefrom;

adder means operable to receive product signals from said multiplying means and to produce output signals at an output thereof;

transfer means coupled between the output of said adder means and said first storage means;

said multiplying means and adder means jointly cooperating to produce at the output of said adder means a series of derivative signals from each of the plurality of signals representative of the integers $a_0 \ldots a_n$, the number of derivative signals in a series being equal to the number assigned to the signal representative of the integer from which the series of derivative signals is produced;

said transfer means being operable to transfer each of the derivative signals in each series in succession from the output of said adder means to said first storage means to be received and stored therein, each derivative signal of a series being stored in said first storage means subsequent to the storage of the signal representative of the integer from which signal the series is derived;

said multiplying means being operable to multiply the value of each of the plurality of signals representative of the integers $a_0 \ldots a_n$ and each derivative signal produced therefrom by a first predetermined quantity, the total number of multiplying operations associated with each of the plurality of signals representative of the integers $a_0 \ldots a_n$ being equal to the number assigned to the signal, and operable to produce a product signal having a value equal to the product;

said adder means being operable to subtract from the value of each of the product signals an amount equal to a second predetermined quantity if the value of the product signal is equal to or greater than said second predetermined quantity and to produce a derivative signal having a value equal to the difference, or operable to produce a derivative signal having a value equal to the value of the product signal if the product signal has a value less than said second predetermined quantity;

said adder means being further operable, after the last derivative signal in each series is produced from a signal representative of one of the integers $a_0 \ldots a_n$ and transferred to and stored in said first storage means, to add the value of the signal present in the first storage means to the value of the signal then present in said second storage means and, if the value of the sum is equal to or greater than said second predetermined quantity, to subtract an amount therefrom equal to said second predetermined quantity and to produce to said second storage means a signal having a value equal to the difference, or, if the value of the sum is less than said second predetermined quantity, to produce to said second storage means a signal having a value equal to the sum; and inverter means operable to provide to said adder means a complement of the signal last stored in said second storage means;

said multiplying means being operable to pass the parity signal therethrough to said adder means without changing the value thereof;

said adder means being operable to add the complemented signal and the parity signal and to produce a first signal condition to said plurality of data storage means if the sum of the values of the complemented and parity signals is equal to a predetermined value, or to produce a second signal condition to said plurality of data storage means if the sum of the values of the complemented and parity signals is other than said predetermined value;

said plurality of data storage means being operable to transfer therefrom said plurality of signals representative of the integers $a_0 \ldots a_n$ in response to receiving said first signal condition.

13. Apparatus in accordance with claim 12 wherein the number of integers in the plurality of integers $a_0 \ldots a_n$ is $m$; each of the $m$ integers has a number $0 \ldots (m-1)$ assigned thereto, said number corresponding to the position of the integer in the $m$ integers; each of the $m$ integers has a value of $0 \ldots, 9$; the first predetermined quantity is 2; and the second predetermined quantity is 11.

14. In a coded-vehicle identification system including a vehicle on which a coded label is disposed; said label being coded to represent a plurality of integers $a_0 \ldots a_n$, each integer having a given number assigned thereto, said number including 0, and each of said plurality of integers $a_0 \ldots a_n$ having a given value; and a parity check integer having a value related to the values of the plurality of integers $a_0 \ldots a_n$, apparatus comprising:

means adapted to acquire from said coded label a plurality of signals representative of the plurality of integers $a_0 \ldots a_n$, each of the plurality of signals having an assigned number and a value corresponding to the assigned number and value of the associated integer, and a parity signal representative of the parity check integer, said parity signal having a value corresponding to the value of the parity check integer;

a plurality of data storage means adapted to receive and to retain said plurality of signals representative of said plurality of integers $a_0 \ldots a_n$;

first storage means adapted to receive and to store in succession the plurality of signals representative of the integers $a_0 \ldots a_n$;

second storage means adapted to store signals;

multiplying means operable to perform multiplication operations on signals received in said first storage means and to produce product signals therefrom;

adder means operable to receive product signals from said multiplying means and to produce output signals at an output thereof;

transfer means coupled between the output of said adder means and said first storage means;

said multiplying means and adder means jointly cooperating to produce at the output of said adder means a series of derivative signals from each of the plurality of signals representative of the integers $a_0 \ldots a_n$, the number of derivative signals in a series being equal to the number assigned to the signal representative of the integer from which the series of derivative signals is produced;

said transfer means being operable to transfer each of the derivative signals in each series in succession from the output of said adder means to said first storage means to be received and stored therein, each derivative signal of a series being stored in said first storage means subsequent to the storage of the signal representative of the integer from which signal the series is derived;

said multiplying means being operable to multiply the value of each of the plurality of signals representative of the integers $a_0 \ldots a_n$ and each derivative signal produced therefrom by a first predetermined quantity, the total number of multiplying operations associated with each of the plurality of signals representative of the integers $a_0 \ldots a_n$ being equal to the number assigned to the signal, and operable to produce a product signal having a value equal to the product;

said adder means being operable to subtract from the value of each of the product signals an amount equal to a second predetermined quantity if the value of the product signal is equal to or greater than said second predetermined quantity and to produce a derivative signal having a value equal to the difference, or operable to produce a derivative signal having a value equal to the value of the product signal if the product signal has a value less than said second predetermined quantity;

said adder means being further operable, after the last derivative signal in each series is produced from a signal representative of one of the integers $a_0 \ldots a_n$ and transferred into and stored in said first storage means, to add the value of the signal present in the first storage means to the value of the signal then present in said second storage means and, if the value of the sum is equal to or greater than said second predetermined quantity, to subtract an amount therefrom equal to said second predetermined quantity and to produce to said second storage means a signal having a value equal to the difference, or, if the value of the sum is less than said second predetermined quantity, to produce to said second storage means a signal having a value equal to the sum; and comparator means adapted to receive the parity signal and the signal last stored in said second storage means and to compare said signals, said comparator means producing a first output signal to said plurality of data storage means if said signals bear a predetermined relationship to each other or a second output signal if said signals do not bear the predetermined relationship to each other;

said plurality of data storage means being operable to transfer therefrom said plurality of signals representative of the integers $a_0 \ldots a_n$ in response to receiving said first output signal.

15. Apparatus in accordance with claim 14 wherein the number of integers in the plurality of integers $a_0 \ldots a_n$ is $m$; each of the $m$ integers has a number $0 \ldots (m-1)$ assigned thereto, said number corresponding to the position of the integer in the $m$ integers; each of the $m$ integers has a value of $0 \ldots 9$; the first predetermined quantity is 2; and the second predetermined quantity is 11.

References Cited

UNITED STATES PATENTS

| | | | |
|---|---|---|---|
| Re. 24,447 | 3/1958 | Bloch | 235—146.1 X |
| 2,805,824 | 9/1957 | Knutson | 235—61.7 |
| 2,857,100 | 10/1958 | Franck et al. | 340—146.1 X |
| 3,036,771 | 5/1962 | Fabiszewski | 235—153 |
| 3,098,994 | 7/1963 | Brown | 340—146.1 |

FOREIGN PATENTS

| | | |
|---|---|---|
| 244,233 | 4/1963 | Australia. |

MALCOLM A. MORRISON, Primary Examiner

C. E. ATKINSON, Assistant Examiner

U.S. Cl. X.R.

235—61.11, 153